(12) United States Patent
Seok

(10) Patent No.: US 9,438,333 B2
(45) Date of Patent: *Sep. 6, 2016

(54) WLAN APPARATUS

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

This patent is subject to a terminal disclaimer.

(21) Appl. No.: 14/520,704

(22) Filed: Oct. 22, 2014

(65) Prior Publication Data

US 2015/0036647 A1    Feb. 5, 2015

Related U.S. Application Data

(63) Continuation of application No. 13/062,215, filed as application No. PCT/KR2009/005037 on Sep. 7, 2009, now Pat. No. 8,897,279.

(30) Foreign Application Priority Data

Sep. 5, 2008    (KR) .................. 10-2008-0087898

(51) Int. Cl.
*H04B 7/26*   (2006.01)
*H04L 29/06*  (2006.01)
*H04W 72/04*  (2009.01)
*H04W 84/12*  (2009.01)
*H04W 88/06*  (2009.01)

(52) U.S. Cl.
CPC ............. *H04B 7/2612* (2013.01); *H04L 69/22* (2013.01); *H04W 72/0453* (2013.01); *H04W 84/12* (2013.01); *H04W 88/06* (2013.01)

(58) Field of Classification Search
CPC .... H04W 16/26; H04W 84/12; H04W 88/06
See application file for complete search history.

(56) References Cited

U.S. PATENT DOCUMENTS

| | | | |
|---|---|---|---|
| 8,897,279 B2 * | 11/2014 | Seok ................ | H04W 16/26 370/310 |
| 2005/0114489 A1 | 5/2005 | Yonge et al. | |
| 2008/0014870 A1 | 1/2008 | Kim | |
| 2008/0130538 A1 * | 6/2008 | Raissinia ............ | H04W 28/06 370/310 |
| 2008/0170531 A1 | 7/2008 | Petry et al. | |

(Continued)

FOREIGN PATENT DOCUMENTS

| KR | 10-2006-0000830 | 1/2006 |
|---|---|---|
| KR | 10-2006-0000830 A | 1/2006 |

OTHER PUBLICATIONS

Korean Intellectual Property Office Application Serial No. 10-2008-0087898, Notice of Allowance dated Jun. 27, 2014, 4 pages.
Korean Intellectual Property Office Application Serial No. 10-2008-0087898, Office Action dated Dec. 17, 2014, 2 pages.

(Continued)

*Primary Examiner* — Siming Liu
(74) *Attorney, Agent, or Firm* — Lee, Hong, Degerman, Kang & Waimey

(57) ABSTRACT

A wireless local area network (WLAN) apparatus for a WLAN system is provided that includes a first medium access protocol (MAC) entity supporting a first frequency band and a second MAC entity supporting a second frequency band, where a MAC management frame for the first frequency band is encapsulated in a MAC management frame for the second frequency band and transmitted via the second frequency band.

14 Claims, 10 Drawing Sheets

(56) References Cited

U.S. PATENT DOCUMENTS

2008/0199183 A1* 8/2008 Liu .................. H04J 3/1617
398/103
2008/0240008 A1* 10/2008 Backes .................. H04L 47/14
370/311

OTHER PUBLICATIONS

John Barr, WLAN Overlay with 60GHz Channel, IEEE 802.11 VHT SG, Mar. 18, 2008.

Eldad Perahia, VHT60 Tutorial, IEEE 802.11 VHT SG, Jul. 14, 2008.

* cited by examiner

FIG. 6

| Frame Control | Duration | Address1 (DA) | Address2 (SA) | Address3 (BSSID) | Sequence Control | Encapsulated MPDU | FCS |

Type: 00(Management)
Subtype: 1111

| Frame Control | Duration | Address1 (DA) | Address2 (SA) | Address3 (BSSID) | Sequence Control | Management MSDU | FCS |

Type: 00(Management)
Subtype: 0000~1110

| Frame Control | Duration | Address1 (DA) | Address2 (SA) | Address3 (BSSID) | Sequence Control | Data MSDU | FCS |

Type: 00(Data)
Subtype: 0000~1110

WLAN APPARATUS

CROSS-REFERENCE TO RELATED APPLICATIONS

This application is a continuation of U.S. application Ser. No. 13/062,215, filed on Apr. 22, 2011, now U.S. Pat. No. 8,897,279, which is the National Stage filing under 35 U.S.C. 371 of International Application No. PCT/KR2009/005037, filed on Sep. 7, 2009, which claims the benefit of earlier filing date and right of priority to Korean Application No. 10-2008-0087898, filed on Sep. 5, 2008, the contents of all of which are incorporated by reference herein in their entireties.

TECHNICAL FIELD

The present invention relates to wireless communications, and more particularly, to a wireless local area network (WLAN) apparatus supporting a multi-band and a method using the same.

RELATED ART

With the recent development of information communication technology, a variety of wireless communication technology has been developed. A WLAN is the technology permitting wireless access to Internet in home or companies or specific service areas by the use of portable terminals such as a personal digital assistant (PDA), a laptop computer, and a portable multimedia player (PMP) on the basis of a radio frequency technology.

The IEEE (Institute of Electrical and Electronics Engineers) 802 which is a standardization of the WLAN technology established in February, 1980 has carried out much standardization work. In the initial WLAN technology, a data rate of 1 to 2 Mbps was supported by the use of frequency hopping, spread spectrum, and infrared communication using a frequency of 2.4 GHz in accordance with the IEEE 802.11. In recent years, 54 Mbps in maximum can be supported by the use of the orthogonal frequency division multiplex (OFDM) technology to the WLAN. In addition, the IEEE 802.11 has developed or is developing a variety of technical standards for improvement in quality of service (QoS), compatibility of an access point (AP) protocol, security enhancement, wireless resource measurement, wireless access in vehicular environment, fast roaming, wireless mesh network, inter-working with external networks, wireless network management, and the like.

Among the IEEE 802.11 standards, IEEE 802.11b uses a frequency band of 2.4 GHz and supports the maximum communication rate of 11 Mbs. IEEE 802.11a commercialized after IEEE 802.11b uses not the frequency band of 2.4 GHz but a frequency band of 5 GHz to thereby lessen effect of interference as compared with that of the significantly confused frequency band of 2.4 GHz, and employs OFDM technology to thereby enhance the maximum communication rate up to 54 Mbps. However, it is disadvantageous that IEEE 802.11a has a shorter communication distance than IEEE 802.11b. Meanwhile, IEEE 802.11g uses the frequency band of 2.4 GHz like IEEE 802.11b but supports the maximum communication rate of 54 Mbps. Further, IEEE 802.11g has attracted a lot of attention since it satisfies backward compatibility, and is superior to IEEE 802.11a in terms of the communication distance.

Also, to overcome a limit to the communication rate that has been pointed out as a weak point in a WLAN system, there is IEEE 802.11n established relatively recently. IEEE 802.11n is intended to enhance the rate and reliability of the network, and extend an operation distance of a wireless network. More specifically, IEEE 802.11n supports a high throughput (HT) with the maximum data processing rate of 540 Mbps or more, and is based on multiple inputs and multiple outputs (MIMO) technology that uses multiple antennas at both a transmitter and a receiver to minimize a transmission error and optimize the data rate. Further, this standard may not only employ a coding method of transmitting several duplicate copies to improve data reliability, but also employ the OFDM technology to increase the rate.

As the WLAN is actively spread and applications using the WLAN become various, a new WLAN system for supporting a throughput higher than the data processing rate supported by IEEE 802.11n has recently been on the rise. However, an IEEE 802.11n medium access control (MAC)/physical layer (PHY) protocol is not effective in providing a throughput of 1 Gbps or more. The reason is because the IEEE 802.11n MAC/PHY protocol is dedicated to operate a single station (STA), i.e., an STA having one network interface card (NIC) and thus overheads are additionally increased as a throughput of a frame increases while keeping the existing MAC/PHY protocol of IEEE 802.11n intact. In conclusion, there is a limit to improvement in the throughput of the wireless communication network while keeping the existing IEEE 802.11n MAC/PHY protocol having the single STA architecture, intact.

Accordingly, to achieve the data processing rate of 1 Gbps or more in the wireless communication network, a new system different from the existing IEEE 802.11n MAC/PHY protocol having the single STA architecture is required. As the next version of the IEEE 802.11n WLAN system, a very high throughput (VHT) WLAN system is one of the IEEE 802.11 WLAN systems that have recently been newly proposed to support the data processing rate of 1 Gbps or more in an MAC service access point (SAP). The term "VHT WLAN system" is arbitrary, and a practicality test is being currently applied to the VHT WLAN system using 4×4 MIMO and a channel bandwidth of 80 MHz in order to provide the throughput of 1 Gbps or more.

In the VHT WLAN, two methods of using a channel of less than 6 GHz and using a channel of 60 GHz are being discussed as a method for achieving the throughput of 1 Gbps or more. Here, the reference of the throughput, i.e., 1 Gbps or more is a value measured in the MAC SAP. The channel or less than 6 GHz shows relatively broad service coverage, but has a disadvantage that an available channel bandwidth is small. On the other hand, the channel of 60 GHz has an advantage that the available channel bandwidth is large, but has relatively narrow service coverage as compared with that of the channel of less than 6 GHz due to the nature of the channel.

As a method of efficiently using the advantage and disadvantage of the two channels, one among recently proposed methods is an overlay WLAN. In the overlay WLAN, the channel of 60 GHz is used when near stations communicate with each other, and the channel of less than 6 GHz is used when distant stations communication with each other. Such an overlay WLAN achieves not only the high throughput by using a relatively large channel bandwidth in the channel of 60 GHz when the stations are located near to each other, but also stable communication by using the channel of less than 6 GHz when the stations are located apart from each other even if the throughput is lowered a little.

FIG. 1 shows topology of a VHT WLAN system for explaining such an overlay WLAN.

Referring to FIG. 1, the VHT WLAN system may include one or more AP VHT STAs, and one or more non-AP VHT STAs. The AP VHT STA may have a multi-radio interface (VHTL6 and VHT60) to support both the channel of less than 6 GHz and the channel of 60 GHz. Further, the non-AP VHT STA may have a dual-band interface for each of the channel of less than 6 GHz and the channel of 60 GHz. However, since the non-AP VHT STA has only a single-radio interface, it cannot support both the channel of less than 6 GHz and the channel of 60 GHz.

As shown in FIG. 1, in the case of the AP VHT STA, the service coverage in the channel of 60 GHz (VHT60 coverage) is relatively narrow, but the service coverage in the channel of less than 60 GHz (VHTL6 coverage) is relative broad. In this case, if the non-AP VHT STA is located within the VHT60 coverage, a relatively high throughput can be achieved because the non-AP VHT STA can use a channel band of 60 GHz in communicating with the AP VHT STA. On the other hand, if the non-AP VHT STA moves from the VHT60 coverage to the VHTL6 coverage, the non-AP VHT STA cannot use the channel band of 60 GHz and has to switch to the channel band of less than 6 GHz so as to communicate with the AP-VHT STA. Thus, if the non-AP VHT STA is located outside the VHT60 coverage, it is difficult to achieve the high throughput since the non-AP VHT STA cannot use the channel band of 60 GHz in communicating with the AP VHT STA.

Besides, if the non-AP VHT STA is located outside the VHT60 coverage, it has to use not the channel band of 60 GHz but the channel band of 6 GHz when communicating with other neighbor non-AP VHT STAs in an ad-hoc mode as well as when communicating with the AP VHT STA in an infrastructure mode. The reason is because the non-AP VHT STA has only the single-radio interface and cannot support both the channel of less than 6 GHz and the channel of 60 GHz. This causes the AP VHT STAs to inevitably use the channel band of less than 6 GHz even though the non-AP VHT STAs are located within the VHTL6 coverage and capable of communicating with each other through the channel band of 60 GHz in the ad-hoc mode, thereby lowering the efficiency of the overlay WLAN in the VHT WLAN system.

DISCLOSURE

Technical Problem

The present invention provides protocol architecture for an overlay WLAN, a frame format for the same, and a transmitting method thereof, in which the efficiency of the overlay WLAN is enhanced by extending 60 GHz-channel service coverage in a VHT WLAN system.

Also, the present invention provides protocol architecture for an overlay WLAN, a frame format for the same, and a transmitting method thereof, in which a non-AP VHT STA can communicate with another neighbor non-AP VHT STA through a channel band of 60 GHz in an ad-hoc mode even though the non-AP VHT STA is located outside VHT60 coverage of an AP VHT STA in the VHT WLAN system.

Further, the present invention provides protocol architecture for an overlay WLAN, a frame format for the same, and a transmitting method thereof, in which a non-AP VHT STA can operate through a channel band of 60 GHz in an infrastructure mode even though the non-AP VHT STA is located outside VHT60 coverage of the AP VHT STA in the VHT WLAN system.

Technical Solution

In an aspect of the invention, there is provided a wireless local network (WLAN) system supporting a first frequency band and a second frequency band which are separated, the WLAN system allowing encapsulating a medium access protocol (MAC) management frame for a first frequency band in a MAC management frame for a second frequency band and transmitting the MAC management frame for the second frequency band through the second frequency band.

In another aspect of the invention, there is provided a protocol architecture for WLAN apparatus that supports overlay WLAN, the protocol architecture including MAC/PHY for a first frequency band and MAC/PHY for a second frequency. A part of the MAC for the first frequency is located above the MAC/PHY for the first frequency band.

In another aspect of the invention, there is provided a protocol architecture for millimeter (mm) portal in WLAN system, the protocol architecture includes MAC/PHY for a first frequency band and MAC/PHY for a second frequency band. A part of the MAC for the second frequency band is located above the MAC/PHY for the first frequency band. The first frequency band comprises a band of 60 GHz and the second frequency comprises a band of less than 6 GHz In another aspect of the invention, there is provided a WLAN apparatus for very high throughput (VHT) WLAN. The WLAN apparatus use a band of 60 GHz when another WLAN apparatus is relatively located nearby the WLAN apparatus, and use a band of less than 6 GHz when the another WLAN apparatus is relatively located far away the WLAN apparatus. When the WLAN apparatus use a band of less than 6 GHz, transmits and receives a MAC management frame for the band of 60 GHz as being included in a body of a frame for the band of 6 HGz.

In another aspect of the invention, there is provided a WLAN apparatus for WLAN system, the WLAN apparatus a first includes a first medium access protocol (MAC) entity which supports a first frequency band and a second MAC entity which supports a second frequency band, wherein a MAC management frame for the first frequency band is encapsulated in a MAC management frame for the second frequency band, and transmitted through the second frequency band.

In another aspect of the invention, there is provided a communication method using a multi-band in a wireless local area network (WLAN) system. The communication method includes encapsulating a medium access protocol (MAC) management frame for a first frequency band in a MAC management frame for a second frequency band and transmitting the MAC management frame for the second frequency band through the second frequency band.

Advantageous Effects

In a WLAN system, it is possible to extend service coverage of a basic service set (BSS) using a band of 60 GHz. Further, non-AP STAs located near to one another form an independent BSS (IBSS) so that they can communicate using a band of 60 GHz to thereby achieve a high throughput, and communicate with a relatively distant AP VHT STA using a band of 6 GHz through a millimeter (mm) portal to thereby interwork with an external network.

DESCRIPTION OF DRAWINGS

FIG. 6 is a block diagram showing a format of an encapsulation management frame.

MODE FOR INVENTION

Figure 1:
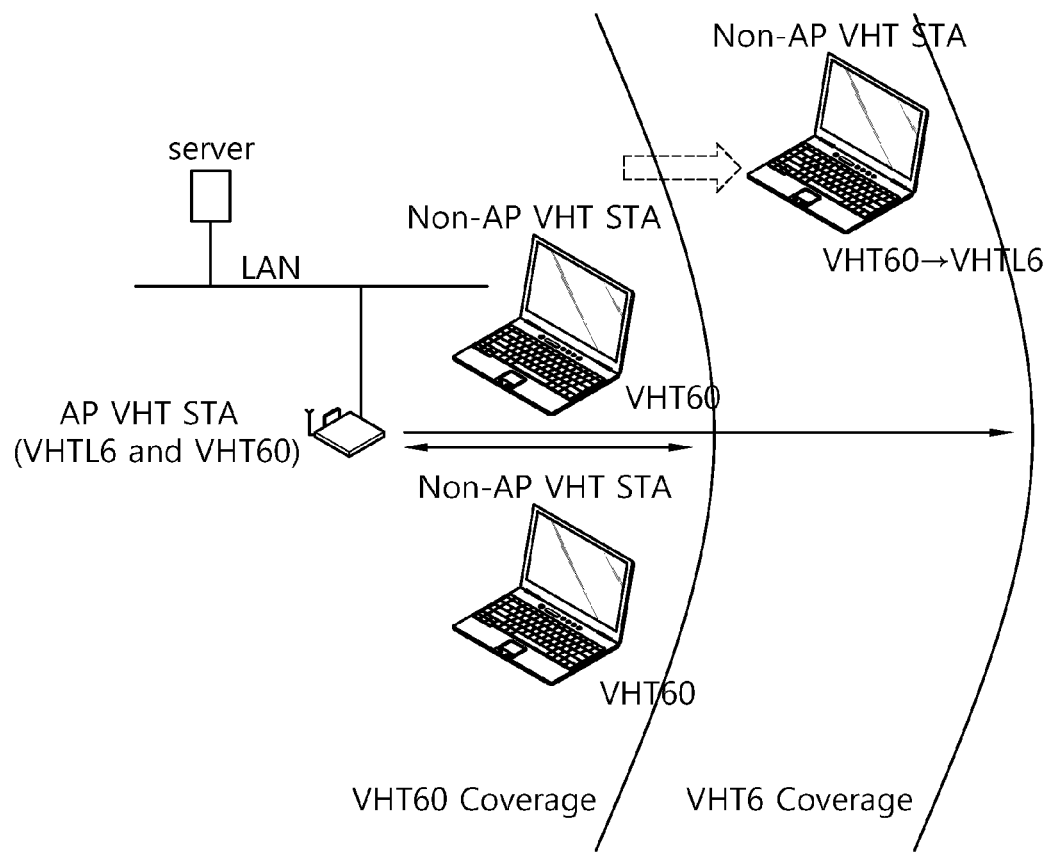
FIG. 1 shows topology of a VHT WLAN system for explaining such an overlay WLAN.
Figure 2:
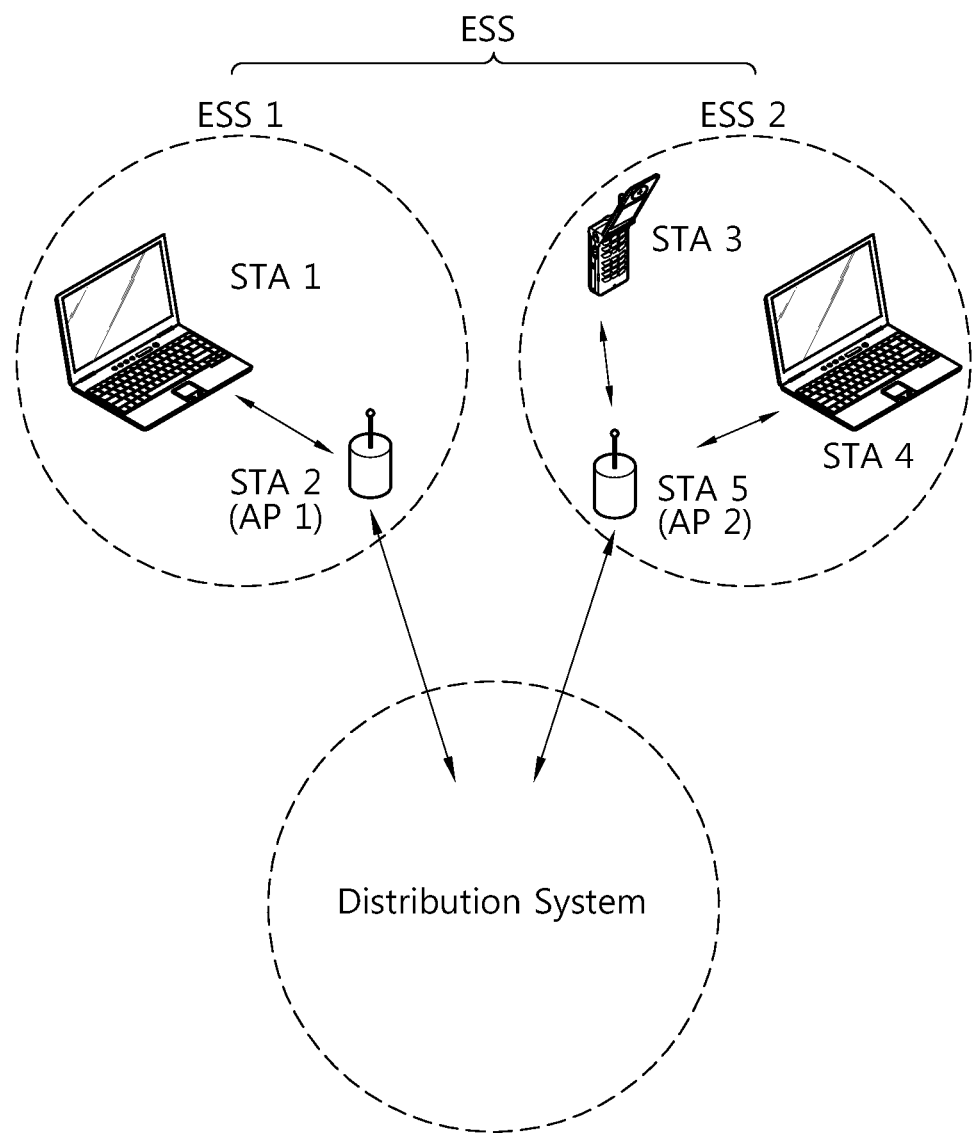
FIG. 2 schematically illustrates a configuration of an example of a very high throughput (VHT) wireless local area network (WLAN) system to which an exemplary embodiment of the present invention can be applied.

FIG. 2 schematically illustrates a configuration of an example of a very high throughput (VHT) wireless local area network (WLAN) system to which an exemplary embodiment of the present invention can be applied.

Referring to FIG. 2, a WLAN system such as the VHT WLAN system includes one or more basis service sets (BSS). The BSS is a set of stations (STA) which are successfully synchronized and capable of communicating with one another, and does not mean a specific region. In a medium access control (MAC) service access point (SAP) like the WLAN system to which an exemplary embodiment of the present invention can be applied, the BSS supporting an ultrahigh data processing rate of 1 GHz or higher will be called a very high throughput (VHT) BSS.

Further, the VHT BSS is divided into an infrastructure BSS and an independent BSS (IBSS). FIG. 2 illustrates the infrastructure BSS. The infrastructure BSS (BSS1, BSS2) includes one or more non-AP STA (non-AP STA1, non-AP STA3 and non-AP STA4), an access point (AP STA1, AP STA2) as a station for providing a distribution service, and a distribution system (DS) connecting the plurality of access points (AP STA1, AP STA2). In the infrastructure BSS, the AP STA manages the non-AP STAs of the BSS.

On the other hand, the independent BSS (IBSS) is a BSS that operates in an ad-hoc mode. The IBSS does not include an AP VHT STA, and thus there is no centralized management entity. That is, in the IBSS, the non-AP STAs are managed in a distributed manner. In the IBSS, all STAs may be mobile stations, and form a self-contained network since access to the DS is not allowed.

The STA is an arbitrary functional medium that complies with the IEEE 802.11 standards and includes medium access control (MAC) and physical layer interfaces to a wireless medium, which refers to both an AP and a non-AP station in a broad sense. Further, in a multi-channel environment to be described later, a STA capable of supporting the ultrahigh data processing rate of 1 GHz or higher will be called the VHT STA. In the VHT WLAN system to which an exemplary embodiment of the present invention can be applied, all the STAs included in the BSS may be the VHT STAs, or the VHT STA and a legacy STA (e.g., HT STA based on IEEE 802.11n) may coexist.

The STA for wireless communication includes a processor (not shown), a transceiver (not shown), a user interface, a display means, etc. The processor is a functional unit devised to generate a frame to be transmitted through a wireless network or process a frame received through the wireless network, which can be achieved by radio protocol architecture. Further, the transceiver is functionally connected to the processor, and devised for the STA to transmit and receive the frame through the wireless network.

Among the STAs, a mobile terminal operable by a user is a non-AP STA (STA1, STA3, STA4, STA6, STA7, STA8), which may indicate a non-AP STA when it is simply called a STA. The non-AP STA may also be differently called a terminal, a wireless transmit/receive unit (WTRU), user equipment (UE), a mobile station (MS), a mobile terminal, a mobile subscriber unit, etc. Further, in the multi-channel environment to be described later, a non-AP STA capable of supporting the ultrahigh data processing rate of 1 GHz or higher will be called the non-AP VHT STA or simply called a VHT STA.

Further, the AP (AP1, AP2) is a functional entity through which access to the DS via a wireless medium is given for an associated station. In the infrastructure BSS including the AP, communication between the non-AP STAs is basically implemented via the AP, but direct communication is possible even between the non-AP STAs if a direct link is set up. The AP may be called a centralized controller, a base station (BS), a node-B, a base transceiver system (BTS), a site controller, etc. as well as the access point. Further, in the multi-channel environment to be described later, an AP capable of supporting the ultrahigh data processing rate of 1 GHz or higher will be called a VHT AP.

The plurality of infrastructure BSSs may be connected to one another through the distribution system (DS). The plurality of BSSs connected through the DS will be called an extended service set (ESS). The STAs included in the ESS can communicate with each other, and the non-AP STA can move from one BSS to another BSS while communicating without disconnection within one ESS.

The DS is a mechanism for communication between one AP and another AP. Through the DS, the AP transmits a frame for the STAs associated with the BSS being under its management, transmits a frame when one STA moves to another BSS, or transmits a frame to a wired network or the like external network. Such a DS is not necessarily achieved by a network, and there is no limit to the DS as long as it can provide a predetermined distribution service regulated in the IEEE 802.11. For example, the DS may be a wireless network such as a mesh network, or a physical structure connecting the APs with one another.

Figure 3:
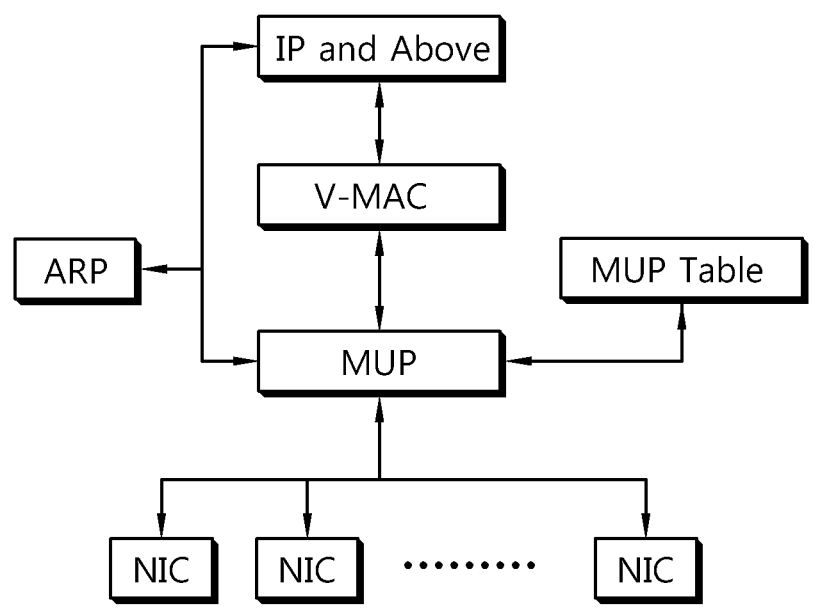
FIG. 3 is a block diagram of a multi-radio unification protocol (MUP) as an example of a protocol applicable to a very high throughput (VHT) system having a plurality of network interface cards (NIC) each of which has an independent radio interface.

FIG. 3 is a block diagram of a multi-radio unification protocol (MUP) as an example of a protocol applicable to a very high throughput (VHT) system having a plurality of network interface cards (NIC) each of which has an independent radio interface. It will be obvious to those skilled in the art that the following exemplary embodiment can be applied to not only a case where many NICs are used to manage a plurality of subchannels as shown in FIG. 3, but also a case where a single NIC is used to manage many subchannels through an orthogonal frequency division multiplex (OFDM). That is, FIG. 3 shows an example to which the exemplary embodiment can be applied, but the present invention is not limited thereto.

Referring to FIG. 3, the VHT STA supporting the MUP includes a plurality of network interface cards (NICs). In FIG. 3, the respective NICs are illustrated as being separated from each other, which means that the MAC/PHY modules of the respective NICs are managed independently of each other. That is, the separation of the NIC shown in FIG. 3 indicates that the NIC is a logical entity operating in accordance with individual MAC/PHY protocols. Thus, the plurality of NICs may be achieved by a functional entity physically distinguished from each other, or integrated as one physical entity.

According to an aspect of the present exemplary embodiment, the plurality of NICs may be divided into a primary radio interface and one or more secondary radio interfaces. In the case that there are the plurality of secondary radio interfaces, the secondary radio interfaces may be divided into a first radio interface, a second radio interface, a third radio interface, etc. The division between the primary radio interface and the secondary radio interface and/or the division of the secondary radio interface may be political or adaptively determined in consideration of a channel environment.

The plurality of NICs are unified and managed through the MUP. In result, the plurality of NICs are recognized as a single device with regard to the exterior. For such an operation, the VHT system includes a virtual (V)-MAC, so that an upper layer cannot recognize operation based on the plurality of NICs in the multi-radio channels. Thus, in the VHT system, the upper layer does not recognize the multi-radio through the V-MAC. That is, one virtual Ethernet address is provided.

Next, the protocol architecture for the overlay WLAN in the VHT WLAN system according to an exemplary embodiment of the present invention, the frame format for the same, and the transmitting method thereof will be described.

As described above, to use a channel band of 60 GHz in the VHT WLAN system, two VHT STAs communicating with each other have to be located near to each other. For example, if the non-AP VHT STA operates in the infrastructure mode through the channel band of 60 GHz, the non-AP VHT STA has to be adjacent to the AP VHT STA. If the non-AP VHT STA is not adjacent to the AP VHT STA, the non-AP VHT STA and other neighbor non-AP VHT STAs have no choice but to operate in the ad-hoc mode.

Generally, if the infrastructure mode is compared with the ad-hoc mode in a throughput, the infrastructure mode is better than the ad-hoc mode. Contrary to the infrastructure mode, it is difficult in the ad-hoc mode to use various WLAN measuring functions or managing functions supported by IEEE 802.11k, IEEE 802.11v, IEEE 802.11u and IEEE 802.11r. Accordingly, it is more efficient for the non-AP VHT STA to operate in the infrastructure mode rather than to operate in the ad-hoc mode. However, as described above, the channel band of 60 GHz has smaller BSS coverage than that of less than 6 GHz due to the nature of the band.

If the above conditions are put together, one method for efficiently managing a radio resource in the VHT WLAN system and enhancing the throughput of the whole system is to extend the service coverage of the VHT BSS in the band of 60 GHz. If the service coverage of the VHT BSS in the band of 60 GHz, the non-AP VHT STA can use the infrastructure mode in a broader range.

According to an exemplary embodiment of the present invention, as a method for extending the service coverage of the VHT BSS in the band of 60 GHz, there is proposed a method of maintaining logical connectivity through physical connectivity in the band of less than 6 GHz even if there is no physical connectivity in the band of 60 GHz. To this end, this exemplary embodiment of the present invention proposes a new format frame for making a management frame used in the band of 60 GHz be used in the band of less than 6 GHz, and a method of using the new format frame to maintain the logical connectivity between the two VHT STAs having no physical connectivity. Further, this exemplary embodiment of the present invention proposes the protocol architecture for a new overlay WLAN capable of perform communication based on the new format frame.

Figure 4:
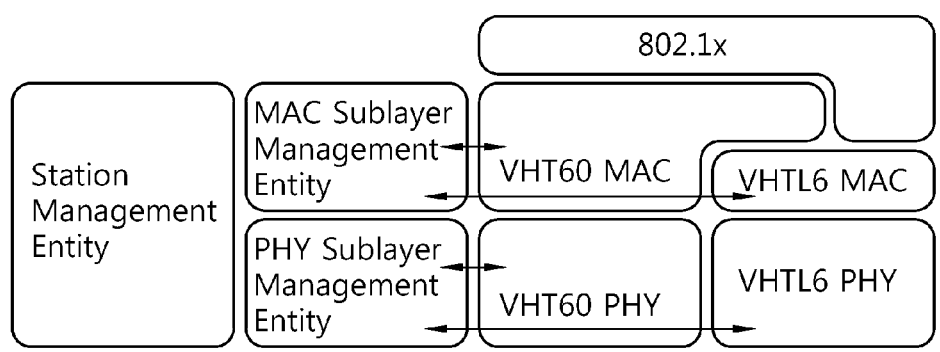
FIG. 4 shows the protocol architecture for an overlay WLAN according to an exemplary embodiment of the present invention, in which the service coverage of the VHT BSS can be extended in the band of 60 GHz.

FIG. 4 shows the protocol architecture for an overlay WLAN according to an exemplary embodiment of the present invention, in which the service coverage of the VHT BSS can be extended in the band of 60 GHz. In FIG. 4, VHT60 MAC and VHT60 PHY indicate VHT MAC and VHT PHY operating in the band of 60 GHz, respectively. Further, VHTL6 MAC and VHTL6 PHY indicate VHT MAC and VHT PHY operating in the band of less than 6 GHz, respectively.

Referring to FIG. 4, the protocol architecture for the overlay WLAN includes a station management entity (SME), an MAC sublayer management entity (MME), a PHY sublayer management entity (PME), VHT60 MAC, VHT60 PHY, VHTL6MAC and VHTL6 PHY, and 802.1x. Through this protocol architecture, for example, MAC service data units (MSDUs) transmitted through IEEE 802.1x may be respectively transmitted through the VHTL6 MAC/PHY and the VHT60 MAC/PHY, the MME interacts with each of the VHT60 MAC and VHTL6 MAC, and the PME interacts with each of the VHT60 PHY and VHTL6 PHY. Thus, the VHT STA having this protocol architecture can perform the communication using the band of 60 GHz or the band of less than 6 GHz.

Further, in the protocol architecture for the overlay WLAN according to an exemplary embodiment of the present invention, the VHT60 MAC is located above the VHTL6 MAC/PHY. This means that a MAC protocol data unit (MPDU) generated in the VHT60 MAC can be used as the MSDU of the VHTL6 MAC. That is, according to an exemplary embodiment of the present invention, the VHT STA may use the band of less than 6 GHz (VHTL6 MAC/PHY) to transmit and receive a management frame or the like needed for operating in the band of 60 GHz.

Figure 5:
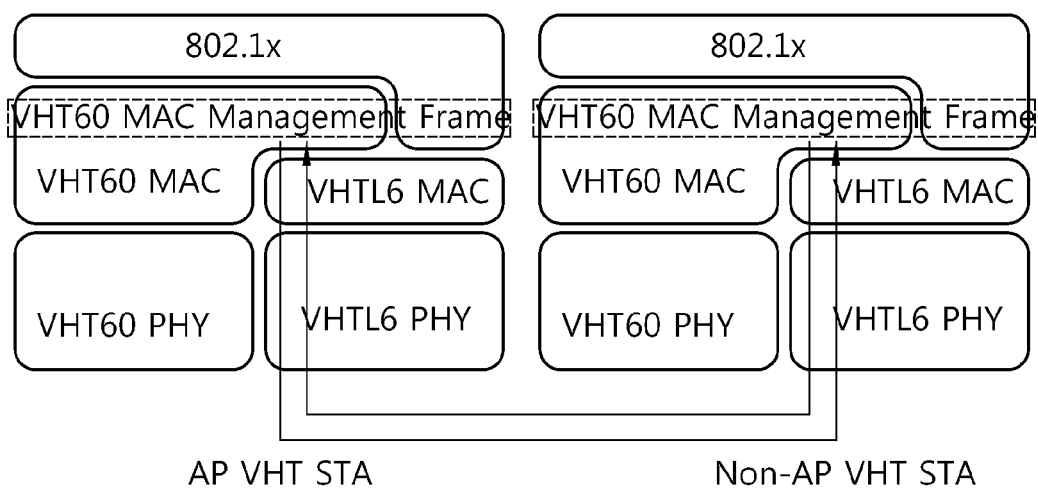
FIG. 5 is a view for explaining an encapsulation management protocol according to an exemplary embodiment of the present invention.

FIG. 5 is a view for explaining an encapsulation management protocol according to an exemplary embodiment of the present invention. The encapsulation management protocol illustrated in FIG. 5 uses the protocol architecture for the overlay WLAN shown in FIG. 4. Referring to FIG. 5, if there is no physical connectivity in the band of 60 GHz between the AP VHT STA and the non-AP VHT STA, the AP VHT STA and the non-AP VHT STA encapsulate the VHT60 MAC management frames and exchange them with each other by using the VHTL6 MAC/PHY. Although there is no physical connectivity in the band of 60 GHz between the AP VHT STA and the non-AP VHT STA, the band of less than 6 GHz is used for the communication, thereby generating or continuously maintaining the logical connectivity.

According to an exemplary embodiment of the present invention, the VHT60 MAC management frames can be encapsulated and transmitted using the VHTL6 MAC/PHY. The VHT60 MAC management frames may correspond to all management frames supported by IEEE 802.11, such as an association request frame, an association response frame, a re-association request frame, a re-association response frame, a management action frame, etc.

FIG. 6 is a block diagram showing a format of an encapsulation management frame. The format of the encapsulation management frame is an exemplary embodiment of the encapsulation management protocol described with reference to FIG. 5, which is nothing but an example.

Referring to FIG. 6, the encapsulation management frame includes a frame control field (frame control), a duration field (duration), a target address field (address 1, DA), a source address field (address 2, SA), a basic service set identifier field (address 3, BSSID), a sequence control field (sequence control), a body field, and a frame check sequence (FCS) field. A type of frame control field in the encapsulation management frame may be set up as a value indicating a management frame, e.g., '00'. Further, a sub-type of the frame control field is an arbitrary value indicating that the corresponding frame is the encapsulation management frame, e.g., '1111'. The sub-type of the encapsulation management frame indicated by the value of '1111' is a new sub-type different from the existing sub-type specified in the IEEE 802.11 standards.

Further, as shown in FIG. 6, a body of the encapsulation management frame includes an MAC management protocol data unit (MMPDU) to be encapsulated. The MMPDU is a complete MPDU that includes a MAC header (frame control, duration, address1 (DA), address2 (SA), address3 (BSSID), and sequence control), a payload (management MSDU or data MSDU), and a cyclic redundancy code (CRC, e.g., FCS), which indicates an MPDU corresponding to the management frame.

In FIG. 6, the encapsulation management frame is a frame generated in the VHTL6 MAC/PHY, which is for making the AP VHT STA and the non-AP VHT STA operate in the band of less than 6 GHz. On the other hand, the MMPDU included in the body of the encapsulation management frame is a frame generated in the VHT60 MAC, which is for making the AP VHT STA and the non-AP VHT STA operate in the band of 60 GHz.

According to an aspect of the present exemplary embodiment, some field may be selectively omitted from the MMPDU included in the body of the encapsulation management frame. For example, the field included in the encapsulation management frame and some fields included in the MMPDU are duplicated, the duplicated fields may not be included in the MMPDU. For example, the MMPDU may not include one or more fields selected among the duration field (duration), the target address field (address 1, DA), the source address field (address 2, SA), the basic service set identifier field (address 3, BSSID), the sequence control field (sequence control), and the frame check sequence (FCS) field.

Then, operations of the AP VHT STA and/or the non-AP VHT STA according to the above encapsulation management protocol will be described. The operations of the VHT STA to be described later are just to illustrate the encapsulation management protocol according to an exemplary embodiment of the present invention, and the exemplary embodiment of the present invention is not limited thereto.

First, an active scan procedure will be described. The non-AP VHT STA operating in the band of 60 GHz generates a probe request frame if the AP VHT STA is not detected in the band of 60 GHz, and encapsulates the probe request frame on the basis of the encapsulation management frame of FIG. 6, thereby transmitting it through the VHTL6 MAC/PHY. The AP VHT STA supporting both the VHT60 MAC/PHY and the VHTL6 MAC/PHY receives and processes the encapsulation management frame through the band of less than 6 GHz (VHTL6 MAC/PHY), and transmits the encapsulated probe request frame to the VHT60 MAC. Further, the VHT AP STA generates a probe response frame in response to the received probe request frame, and encapsulates the probe response frame on the basis of the encapsulation management frame of FIG. 6, thereby transmitting it to the non-AP VHT STA through the VHTL6 MAC/PHY.

Next, a procedure of transmitting a beacon frame will be described. The AP VHT STA generates a beacon frame through the VHT60 MAC, and encapsulates the beacon frame on the basis of the encapsulation management frame of FIG. 6, thereby broadcasting it through the VHTL6 MAC/PHY. Although such an encapsulated beacon frame is broadcasted through the band of less than 6 GHz, the non-AP VHT STA that receives the encapsulated beacon frame uses the received frame to detect the AP VHT STA that operates in not the band of less than 6 GHz but the band of 60 GHz.

Next, an association procedure or an authentication procedure will be described. According to an exemplary embodiment of the present invention, the AP VHT STA and the non-AP VHT STA encapsulates an association request frame, an association response frame, a re-association request frame, a re-association response frame, an authentication frame, and/or a de-authentication frame on the basis of the encapsulation management frame of FIG. 6, and then transmits it to the other party VHT STA (e.g., the AP VHT STA or the non-AP VHT STA) through the VHTL6 MAC/PHY. Through these procedures, it is possible to set up the logical connectivity between the AP VHT STA and the non-AP VHT STA in the band of 60 GHz.

If the logical connectivity is set up between the AP VHT STA and the non-AP VHT STA in the band of 60 GHz, the AP VHT STA set up operation parameters such as a channel number or the like, which the non-AP STA has to use in the band of 60 GHz. In addition, the AP VHT STA transmits action frames related to radio resource measurement, radio network management, etc. to the non-AP STA, thereby collecting information. The action frames are also encapsulated on the basis of the encapsulation management frame of FIG. 6 and then transmitted.

According to this exemplary embodiment of the present invention, there is no physical connectivity between the non-AP VHT STA and the AP VHT STA in the band of 60 GHz. Therefore, the non-AP VHT STAs operating in the ad-hoc mode can exchange data or the like through the band of 60 GHz. That is, data transmission of 60 GHz is possible between the non-AP VHT STAs adjacent to each other. In this case, the AP VHT STA may transmit scheduled elements or the like to the non-AP VHT STA in order to control channel access between the non-AP VHT STAs, thereby performing channel access time coordination.

Next, another exemplary embodiment of the present invention using the protocol architecture for the foregoing overlay WLAN and the encapsulation management frame format will be described. This exemplary embodiment relates to a service using a millimeter (mm) portal. Through this service, the plurality of non-AP VHT STAs constituting the independent BSS can interact with an external network (e.g., the AP VHT STA) through the non-AP VHT STA functioning as the millimeter portal, which will be described in detail.

Figure 7:
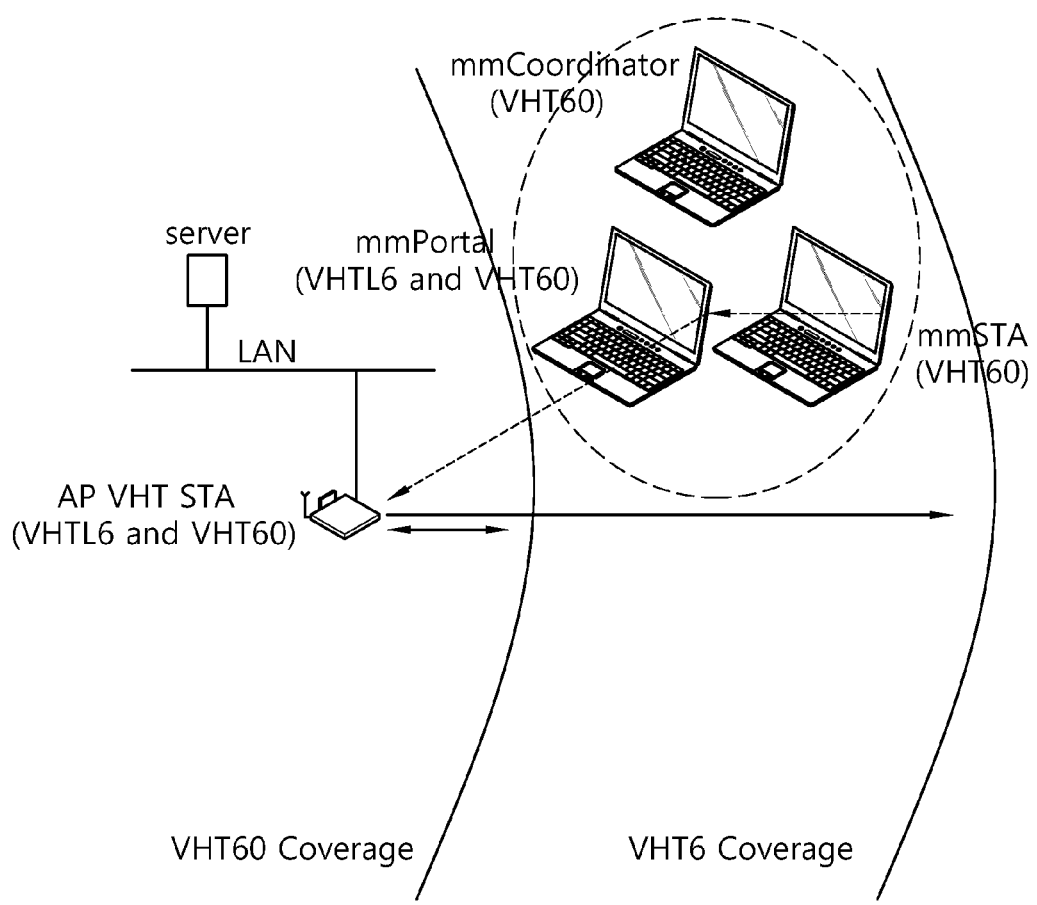
FIG. 7 shows topology where the non-AP VHT STAs constituting the IBSS sing the VHT60 MAC/PHY interact with the external network through the non-AP VHT STA functioning as the millimeter portal.

FIG. 7 shows topology where the non-AP VHT STAs constituting the IBSS using the VHT60 MAC/PHY interact with the external network through the non-AP VHT STA functioning as the millimeter portal. The IBSS including the non-AP VHT STA serving as the millimeter portal may be called a millimeter IBSS, which is just an example.

Therefore, the non-AP VHT STAs forming the millimeter IBSS can interact with the AP VHT STA through the millimeter portal. To this end, the millimeter portal can communicate with the AP VHT STA even though it is located beyond the service coverage of the band of 60 GHz of the AP VHT STA (millimeter portal). Accordingly, the millimeter portal may be a device supporting the VHTL6 MAC/PHY in addition to the VHT60 MAC/PHY among the non-AP VHT STAs constituting the millimeter IBSS. The millimeter portal supports routing, forwarding, etc. of data between the millimeter IBSS and the external network. Here, the external network includes Ethernet, Bluetooth, WiMax, etc. as well as the VHT WLAN using the band of less than 6 GHz.

Further, the millimeter IBSS may also be provided with a millimeter (mm) coordinator. This millimeter coordinator is a non-AP VHT STA that performs a function of managing the IBSS among the plurality of non-AP VHT STAs constituting the millimeter IBSS.

Figure 8:
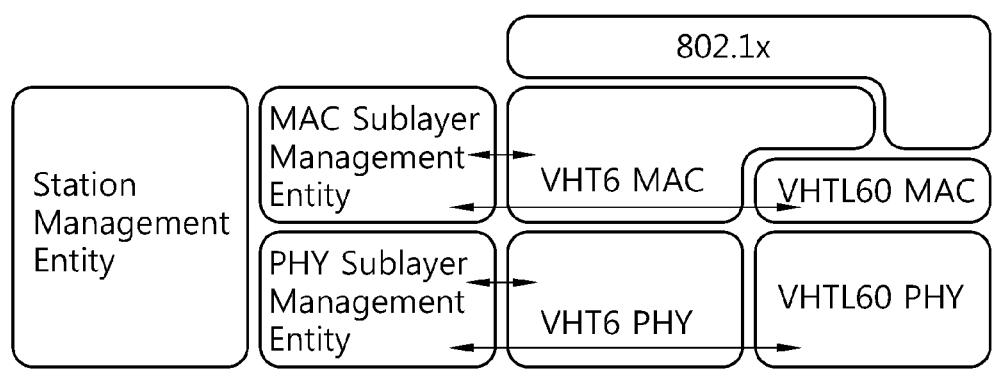
FIG. 8 shows the protocol architecture of the millimeter portal when the millimeter portal interacts with the external network through the VHT WLAN using the band of less than 6 GHz.

FIG. 8 shows the protocol architecture of the millimeter portal when the millimeter portal interacts with the external network through the VHT WLAN using the band of less than 6 GHz. Referring to FIG. 8, the MAC protocol data unit (MPDU) generated in the VHTL6 MAC can be used as the MAC service data unit (MSDU) of the VHT60 MAC, the detailed procedure about which was described together with the protocol architecture for the overlay WLAN and the corresponding protocol, and thus repetitive descriptions will be avoided.

Figure 9:
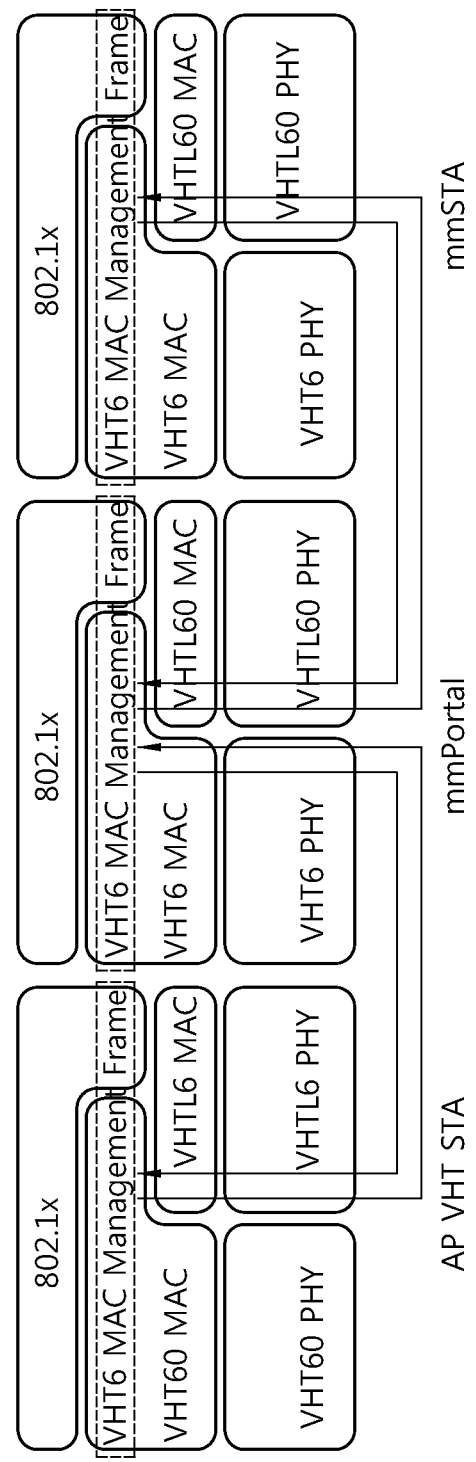
FIG. 9 is a view for explaining the encapsulation management protocol for the millimeter portal according to an exemplary embodiment of the present invention.

FIG. 9 is a view for explaining the encapsulation management protocol for the millimeter portal according to an exemplary embodiment of the present invention. Here, the left arrow in FIG. 9 denotes a communication protocol between the AP VHT STA and the non-AP VHT STA functioning as the millimeter portal, and the right arrow in FIG. 9 denotes a communication protocol between the non-AP VHT STA serving as the millimeter portal and another non-AP VHT STA (hereinafter, referred to as a "millimeter station (mmSTA)") constituting the millimeter portal and the millimeter IBSS.

Referring to FIG. 9, communication using the VHTL6 MAC/PHY is achieved between the AP VHT STA and the millimeter portal. More specifically, the MPDU generated in the VHT60 MAC of the AP VHT STA, i.e., the VHT60 MAC management frames are transmitted through the VHTL6 MAC/PHY of the AP VHT STA. In other words, the VHT60 MAC management frames are encapsulated as the format of the VHTL6 MAC management frame, and transmitted to the millimeter portal. Further, the VHTL6 MAC/PHY of the millimeter portal processes the received VHTL6 MAC management format, and extracts the VHT60 MAC management frame from the body. The extracted VHT60 MAC management frame is communicated through the VHT60 MAC/PHY between the millimeter portal and another non-AP VHT STA (mmSTA).

Although it is not specifically illustrated in FIG. 7, the VHT60 MAC management frame that the millimeter portal receives from another non-AP VHT STA can be encapsulated in the form of the VHTL6 MAC management frame and transmitted to the AP VHT STA (see FIG. 5). In this case, the millimeter portal may support the protocol architecture shown in FIG. 4 in addition to the protocol architecture shown in FIG. 8.

Thus, in the encapsulation management protocol for the millimeter portal described with reference to FIG. 9, the MPDUs transmitted by the AP VHT STA and the non-AP VHT STA (mmPortal and mmSTA) may be encapsulated through MAC/PHY of other wireless bands and then transmitted. Thus, the format of the encapsulated management frame may have the format of the frame shown in FIG. 6 by way of example. That is, in the case that the non-AP VHT STA transmits the MPDU to the AP VHT STA, the corresponding MPDU may be encapsulated using the encapsulation management frame shown in FIG. 6. In this case, the VHTL6 MAC management frame may be encapsulated in the form of the VHT60 MAC management frame, or conversely the VHT60 MAC management frame may be encapsulated in the form of the VHTL6 MAC management frame.

For example, the management frame generated in the VHTL6 MAC of another non-AP VHT STA (mmSTA) is encapsulated in the form of the VHT60 MAC management frame, and transmitted to the millimeter portal through the VHT60 MAC/PHY. Further, the millimeter portal may transmit the corresponding frame again to the AP VHT STA through the VHTL6 MAC/PHY.

To use the encapsulation management protocol for the millimeter portal shown in FIG. 9, the millimeter portal has to announce such a fact to other non-AP VHT STAs. For example, the military portal may transmit an action frame, e.g., a millimeter portal announcement action frame for announcing this fact to other non-AP VHT STAs that belong to the millimeter IBSS.

Also, the non-AP VHT STA, which wants to interact with the external network through the millimeter portal, may transmit such a request to the millimeter portal. For example, the non-AP VHT STA (mmSTA) may transmit a millimeter portal request action frame to the millimeter portal. In this case, the millimeter portal, which receives the millimeter portal request action frame, transmits a response message to the non-AO VHT STA, thereby notifying whether to accept the request. For example, the response message may be a millimeter portal response action frame.

Figure 10:
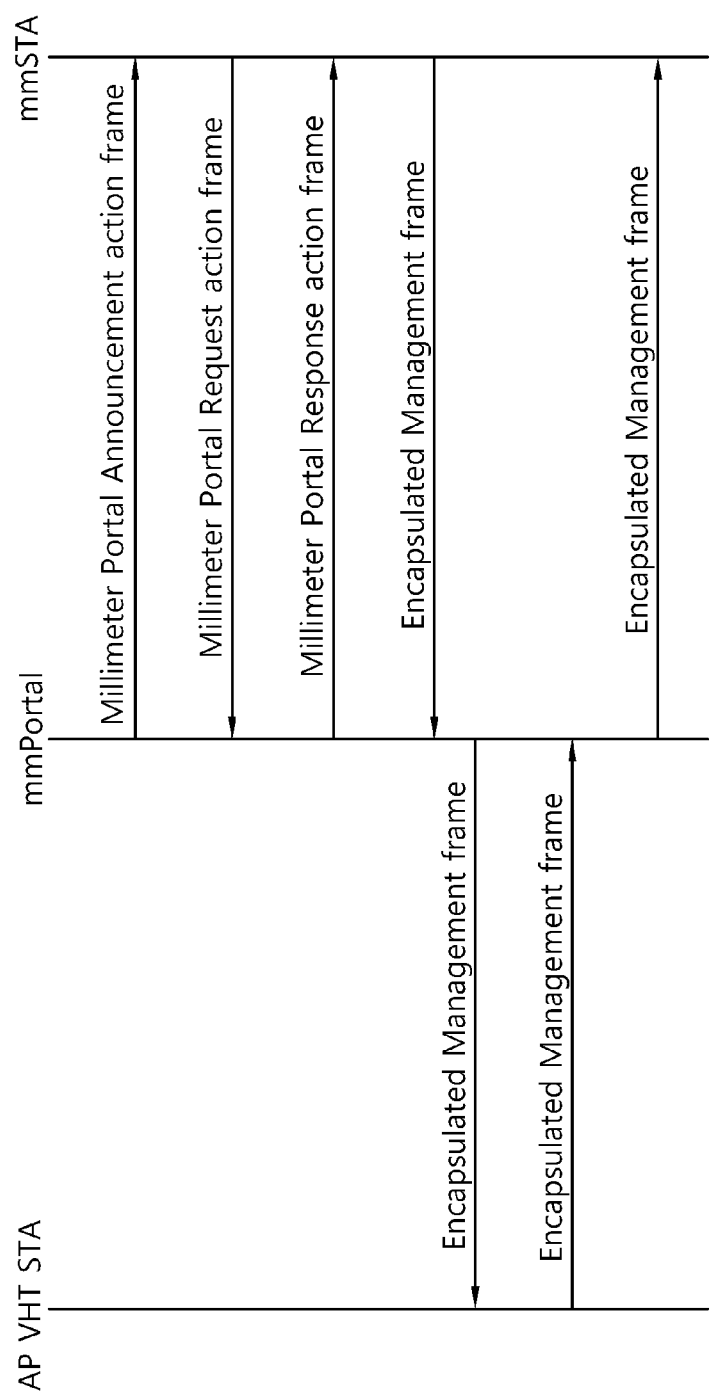
FIG. 10 is a message flow chart illustrating that an encapsulated management frame is exchanged between the AP VHT STA and the mm STA through the millimeter portal, together with a message exchange procedure based on a millimeter portal announcement protocol.

FIG. 10 illustrates that an encapsulated management frame is exchanged between the AP VHT STA and the mm STA through the millimeter portal, together with a message exchange procedure based on a millimeter portal announcement protocol.

Exemplary embodiments have been described above to just show technical idea of the present invention, and thus the exemplary embodiments should be considered in descriptive sense only and not for purposes of limitation. Therefore, the scope of the invention is defined not by the detailed description of the invention but by the appended claims.

The invention claimed is:

1. A device supporting multi-band in a wireless local area network, the device comprising:
   network interface circuitry configured to implement a Station Management Entity (SME), a first Medium Access Control (MAC) entity and a second MAC entity, wherein the SME is configured to manage multi-band operation in which the device supports more than two frequency bands;

wherein the first MAC entity is configured to construct a MAC Management Protocol Data Unit (MMPDU) that is destined for a first MAC entity of a receiving device;

wherein the second MAC entity is configured to generate an encapsulation management frame by encapsulating the MMPDU and to transmit the encapsulation management frame via a wireless medium, wherein the encapsulation management frame includes a first frame control field, a second frame control field and a frame body field, wherein the first frame control field includes frame control for the encapsulation management frame, wherein the second frame control field includes frame control for the MMPDU, wherein the frame body field includes a frame body of the MMPDU, and wherein the first MAC entity operates at a first frequency band and the second MAC entity operates at a second frequency band that is different from the first frequency band.

2. The device of claim 1, wherein the frame control for the encapsulation management frame is different from the frame control for the MMPDU.

3. The device of claim 1, wherein the encapsulation management frame does not include a Frame Check Sequence (FCS) field of the MMPDU.

4. The device of claim 1, wherein the encapsulation management frame further includes information used to identify the first MAC entity of the receiving device.

5. The device of claim 1, wherein the MMPDU is used to perform authentication or association between the device and the receiving device.

6. The device of claim 1, wherein the first frequency band is a 5 GHz band and the second frequency is a 60 GHz band.

7. The device of claim 1, wherein the first frequency band is a 60 GHz band and the second frequency is a 5 GHz band.

8. A method for supporting multi-band in a wireless local area network, the method performed by a transmitting device including a Station Management Entity (SME), a first Medium Access Control (MAC) entity and a second MAC entity and comprising:

constructing a MAC Management Protocol Data Unit (MMPDU) by the first MAC entity, the MMPDU destined for a first MAC entity of a receiving device;

generating an encapsulation management frame by the second MAC entity by encapsulating the MMPDU; and transmitting the encapsulation management frame via a wireless medium by the second MAC entity, wherein the encapsulation management frame includes a first frame control field, a second frame control field and a frame body field, wherein the first frame control field includes frame control for the encapsulation management frame, wherein the second frame control field includes frame control for the MMPDU, wherein the frame body field includes a frame body of the MMPDU, and wherein the first MAC entity operates at a first frequency band and the second MAC entity operates at a second frequency band that is different from the first frequency band.

9. The method of claim 8, wherein the frame control for the encapsulation management frame is different from the frame control for the MMPDU.

10. The method of claim 8, wherein the encapsulation management frame does not include a Frame Check Sequence (FCS) field of the MMPDU.

11. The method of claim 8, wherein the encapsulation management frame further includes information used to identify the first MAC entity of the receiving device.

12. The method of claim 8, wherein the MMPDU is used to perform authentication or association between the transmitting device and the receiving device.

13. The method of claim 8, wherein the first frequency band is a 5 GHz band and the second frequency is a 60 GHz band.

14. The method of claim 8, wherein the first frequency band is a 60 GHz band and the second frequency is a 5 GHz band.

* * * * *